United States Patent
Karmon et al.

(10) Patent No.: US 10,345,919 B2
(45) Date of Patent: Jul. 9, 2019

(54) ACCESSORY BETWEEN DISPLAY AND KEYBOARD

(71) Applicant: Microsoft Technology Licensing, LLC, Redmond, WA (US)

(72) Inventors: Kfir Karmon, Petach-Tikva (IL); Adi Diamant, Shoham (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/013,064

(22) Filed: Feb. 2, 2016

(65) Prior Publication Data
US 2017/0220128 A1 Aug. 3, 2017

(51) Int. Cl.
*G06F 3/02* (2006.01)
*G06F 3/01* (2006.01)
*G06F 3/00* (2006.01)
*G06F 1/16* (2006.01)

(52) U.S. Cl.
CPC .......... *G06F 3/0219* (2013.01); *G06F 1/1632* (2013.01); *G06F 3/005* (2013.01); *G06F 3/017* (2013.01); *G06F 3/0208* (2013.01)

(58) Field of Classification Search
CPC .... G06F 1/1681; G06F 1/1683; G06F 1/1633; G06F 1/1654; G06F 1/1669
See application file for complete search history.

(56) References Cited

U.S. PATENT DOCUMENTS

| | | | |
|---|---|---|---|
| 8,489,157 B2 * | 7/2013 | Rak | G06F 1/1616 379/428.01 |
| 9,213,414 B1 * | 12/2015 | Henty | G06F 3/02 |
| 9,577,372 B1 * | 2/2017 | Kakish | H01R 13/6205 |
| 2004/0097258 A1 * | 5/2004 | Lee | H04M 1/0216 455/550.1 |
| 2005/0078211 A1 * | 4/2005 | Whitehorn | H04N 1/2112 348/376 |
| 2005/0110887 A1 * | 5/2005 | Shin | H04M 1/021 348/333.06 |
| 2007/0002025 A1 * | 1/2007 | Sauer | G06F 1/1626 345/168 |
| 2007/0057866 A1 * | 3/2007 | Lee | H04M 1/0218 345/1.1 |
| 2010/0149099 A1 * | 6/2010 | Elias | G06F 1/1616 345/168 |
| 2011/0006991 A1 * | 1/2011 | Elias | G06F 1/1662 345/168 |

(Continued)

OTHER PUBLICATIONS

International Search Report and the Written Opinion dated May 17, 2017 From the International Searching Authority Re. Application No. PCT/US2017/015539. (14 Pages).

*Primary Examiner* — Dong Hui Liang

(57) ABSTRACT

An apparatus including a housing for coupling a keyboard to a tablet device through at least one respective electric interface and circuitry integrated in the housing, and a camera sensor integrated in the housing, the camera sensor positioned such that a central axis of a field of view (FOV) of the camera sensor is substantially parallel to a surface of the keyboard, the camera sensor further positioned to capture a plurality of images and to transmit the plurality of images to the tablet device through the respective electric interface and the electric circuitry. Related apparatus and methods are also described.

24 Claims, 9 Drawing Sheets

(56) References Cited

U.S. PATENT DOCUMENTS

| | | | |
|---|---|---|---|
| 2012/0113578 A1* | 5/2012 | Holung | G06F 1/162 361/679.07 |
| 2014/0300541 A1* | 10/2014 | Skogoe | G06F 1/1681 345/156 |
| 2014/0362509 A1* | 12/2014 | Lin | G06F 1/1669 361/679.12 |
| 2015/0020034 A1* | 1/2015 | Okuley | G06F 1/1616 715/863 |
| 2015/0036273 A1* | 2/2015 | Hui | G06F 1/1654 361/679.08 |
| 2015/0220113 A1 | 8/2015 | Zhao et al. | |
| 2015/0331463 A1 | 11/2015 | Obie et al. | |

\* cited by examiner

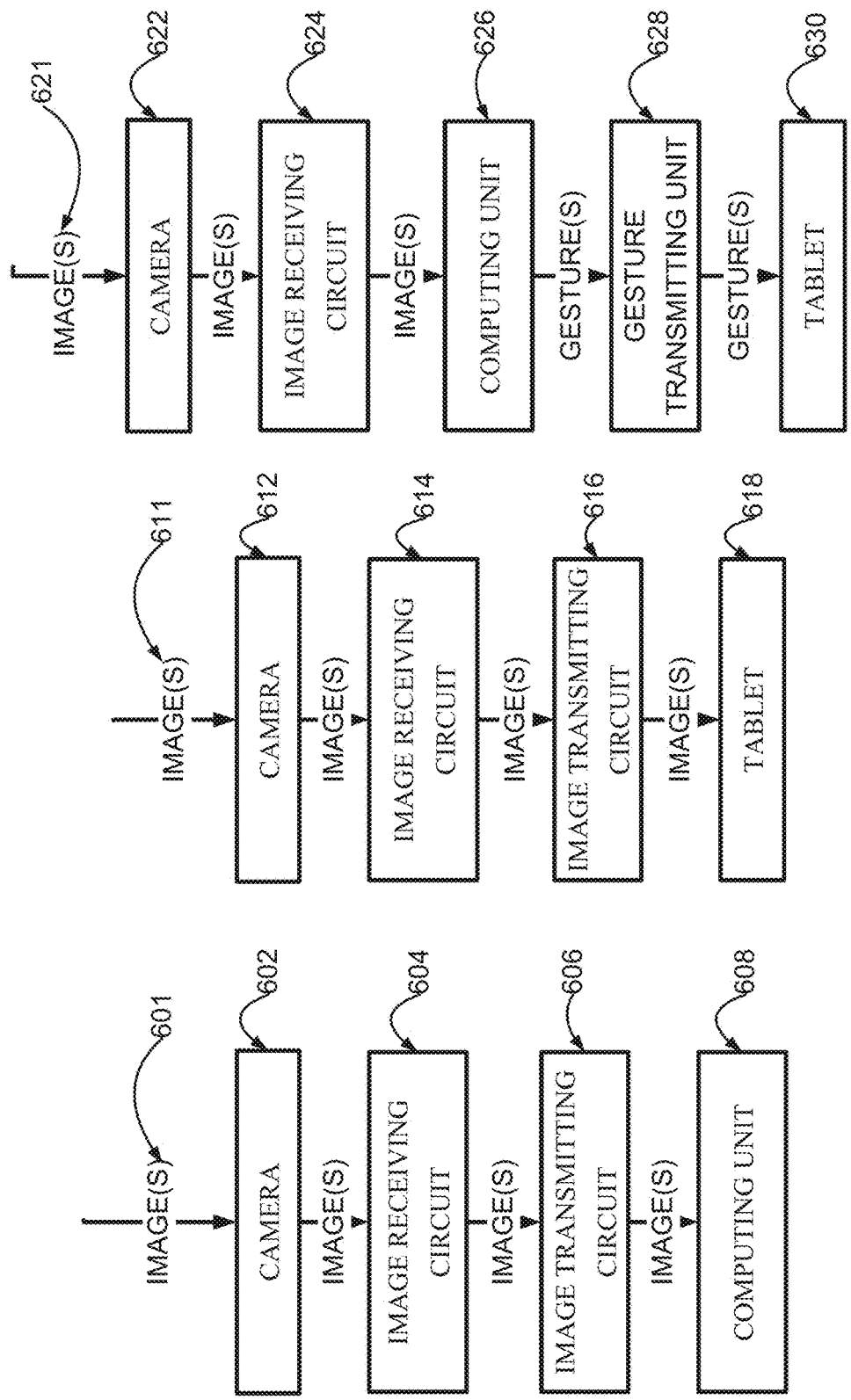

ACCESSORY BETWEEN DISPLAY AND KEYBOARD

BACKGROUND

Various types of systems are presently used to pick up human movement, and some translate the human movement to gestures used for implementing a man-machine-interface.

Some present computer system include a tablet computer and a keyboard, where the tablet computer can be used without the keyboard, yet the keyboard can be attached to the tablet and provide keyboard input function while attached to the tablet computer.

Additional background art includes:

U.S. patent application Ser. No. 14/985,728, filed on 31 Dec. 2015 for Electrical Device For Hand Gestures Detection; and U.S. patent application Ser. No. 14/985,803, filed on 31 Dec. 2015 for Structure And Training For Image Classification.

The disclosures of all references mentioned above and throughout the present specification, as well as the disclosures of all references mentioned in those references, are hereby incorporated herein by reference.

SUMMARY

An aspect of the disclosure includes an imager-integrated accessory adapted for electrically connecting a display or a tablet or a tablet-like device to a keyboard, in some embodiments while mechanically supporting the display or the tablet or the tablet-like device, and positioning the imager to have a central axis of a field-of-view (FOV) approximately parallel to a plane of the keyboard. In some embodiments the imager captures images and forwards them to the tablet or the tablet-like device for analysis, for example for detecting hand gestures occurring above or in proximity to the keyboard. In some embodiments the imager captures images and forwards them to a computing circuit in the accessory, such as an ASIC in the accessory, for the analysis, and the computing circuit transmits higher level results of the analysis to the tablet or the tablet-like device, for example transmitting information identifying gestures.

In some embodiments, the accessory may also be attached to a tablet, and electrically connect the tablet and the keyboard, potentially transferring keyboard signals to the tablet.

In some embodiments, the accessory includes a hinge for setting an angle between the tablet screen and the keyboard, while maintaining an angle of the central axis of the FOV of the imager approximately parallel to a plane of the keyboard. The accessory enables changes in the tablet to keyboard angle while optionally enabling small or no changes in the imager's view of a space above the keyboard, so as to enable the camera to continue capturing gestures in a same approximate volume even if the tablet to keyboard angle is changed.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings:

FIGS. 6A, 6B and 6C are simplified flow chart illustrations of data flow between a camera and a computing unit and a tablet respectively, according to example embodiments of the disclosure.

DETAILED DESCRIPTION

An aspect of the disclosure includes an imager-integrated accessory adapted for electrically connecting a tablet or a tablet-like device to a keyboard while mechanically supporting the tablet or the tablet-like device, and positioning the imager to have a central axis of a field-of-view (FOV) approximately parallel to a plane of the keyboard. The imager captures images and forwards them to the tablet or the tablet-like device for analysis, for example for detecting hand gestures occurring above or in proximity to the keyboard.

In some embodiments a lower bound of the FOV may be parallel to the keyboard, and the FOV may extend upward to catch a user's face, potentially performing face detection and/or face recognition, and potentially even for enabling gaze control.

In some embodiments the accessory may include a computing circuit, for example an ASIC, for analyzing images and optionally performing gesture analysis, and transmitting data identifying gestures, such as gesture events, to the tablet.

The terms tablet and tablet-like are used throughout the present specification and claims to mean flat display devices such as tablet computers (e.g. Microsoft Surface, Surface Pro, Surface Book), flat screens (e.g. LCD screens) and all-in-one computers which include a flat screen and a computer in a flat housing.

In some embodiments, images are sent to the tablet via an electric contact.

In some embodiments, the images are sent to the tablet by wireless transmission, such as by a Bluetooth™ connection.

In some embodiments, the accessory may also be attached to a tablet, and electrically connect the tablet and the keyboard, potentially transferring keyboard signals to the tablet.

In some embodiments, the accessory includes a hinge for setting an angle between the tablet screen and the keyboard, while maintaining an angle of the central axis of the field-of-view (FOV) of the imager approximately parallel to a plane of the keyboard. The accessory enables changes in the tablet to keyboard angle while optionally enabling small or no changes in the imager's view of a space above the keyboard, so as to enable the camera to continue capturing gestures in a same approximate volume even if the tablet to keyboard angle is changed.

Various types of imagers are used in various embodiments, such as, by way of some non-limiting examples, one or more cameras, a 3D camera, and a stereoscopic camera.

Additional types of sensing devices may be used for gesture or face or gaze tracking, such as, by way of some non-limiting examples, electric field or sonar, optionally directed approximately parallel to the keyboard.

In some embodiments, the accessory may potentially include an extension to support a back of the tablet and/or screen which the accessory attaches to the screen.

Figure 1:
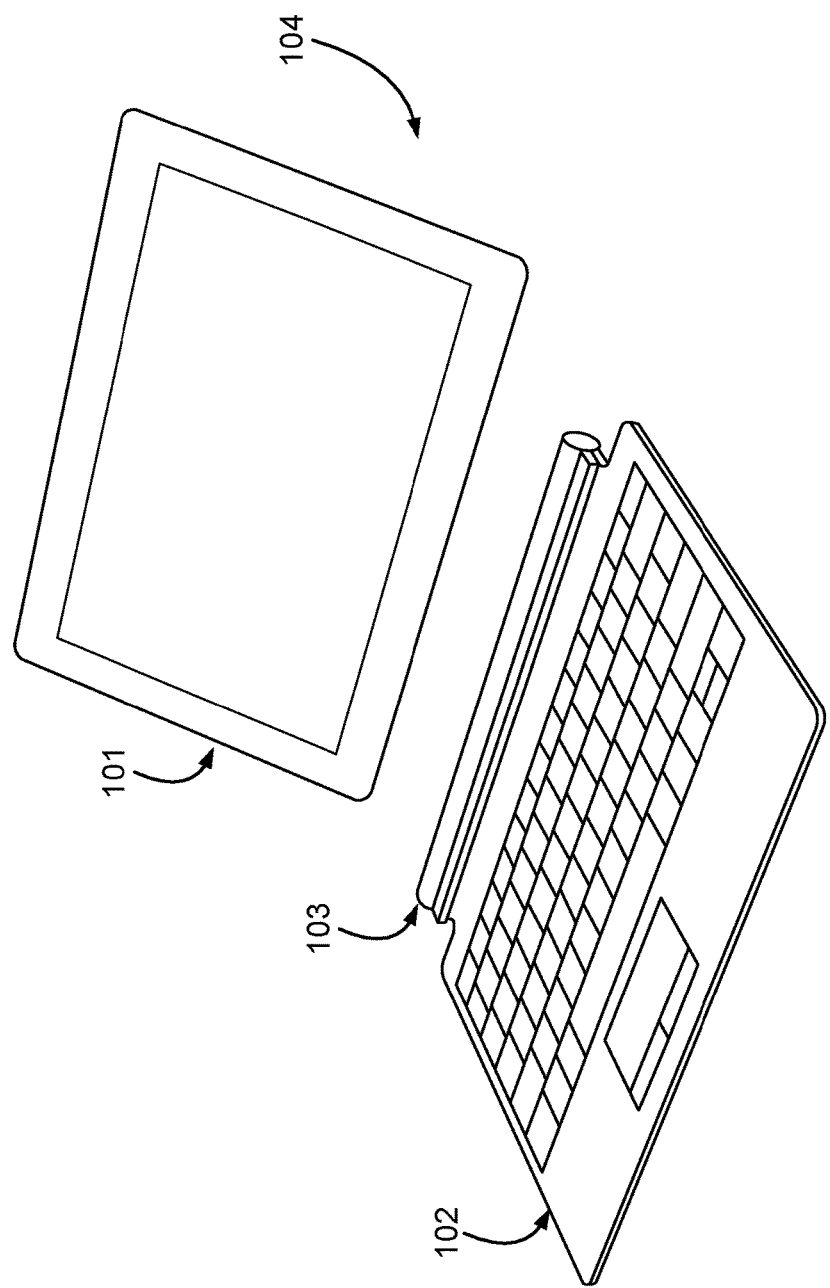
FIG. 1 is a simplified illustration of a tablet and a keyboard according to prior art.

For purposes of better understanding some embodiments of the present disclosure, reference is first made to the construction and operation of a tablet and keyboard as illustrated in FIG. 1, which is a simplified illustration of a tablet and a keyboard according to prior art.

FIG. 1 depicts a tablet 101, a keyboard 102, and a portion 103 of the keyboard 102 which can serve to attach the tablet 101 to the keyboard 102.

FIG. 1 also depicts a support 104 for the tablet 101, to hold the tablet at a convenient viewing angle.

Before explaining at least one embodiment of the exemplary embodiments in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Figure 2:
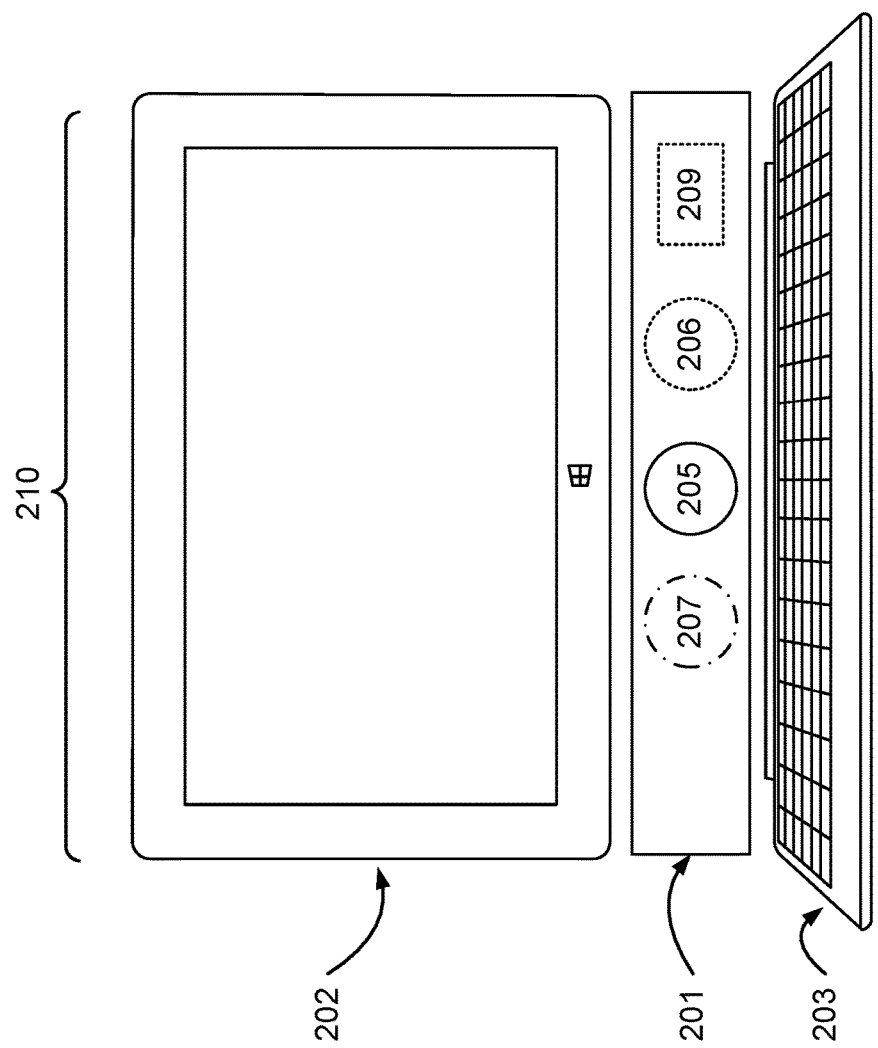
FIG. 2 is a simplified illustration of an accessory between a tablet and a keyboard according to an example embodiment of the disclosure.

Reference is now also made to FIG. 2, which is a simplified illustration of an accessory 201 between a tablet 202 and a keyboard 203 according to an example embodiment of the disclosure.

FIG. 2 shows how the accessory 201 can have a camera sensor included within and having a field of view (FOV) substantially parallel to a surface of the keyboard 203.

FIG. 2 shows the accessory 201 with a camera lens 205. A camera (not shown) is within the accessory 201, and therefore not seen in FIG. 2.

In some embodiments the accessory 201 optionally includes a second camera, whose lens 206 is depicted in FIG. 2.

In some embodiments the accessory 201 optionally includes a computing circuit 209, by way of a non-limiting example an ASIC (Application Specific Integrated Circuit) for analyzing images and optionally transmitting data identifying gestures, such as, by way of a non-limiting example, gesture events, optionally to the tablet 202.

In some embodiments the accessory 201 optionally includes a light source 207 for illuminating a field of view (FOV) of the one or more cameras in the accessory 201. The light source 207 may illuminate at a wavelength in which the camera(s) are sensitive, and in some embodiments the light source 207 may provide light in a wavelength not necessarily visible by humans, such as infra-red or near infra-red.

In some embodiments the cameras may optionally include one or more filter(s) (not shown) which filter light passing into the camera(s). By way of a non-limiting example the filter may be a plastic cover which allows infra-red light through, and may hide the camera lens(es) 205 206 and/or the light source(s) 207.

The accessory 201 optionally attaches the tablet 202 and the keyboard 203 mechanically to each other. The accessory 201 optionally supports the tablet 202 at various angles relative to the keyboard 203.

The accessory 201 optionally attaches the tablet 202 and the keyboard 203 electrically to each other. The accessory 201 optionally includes electrical connectors for connecting to the tablet 202 and to the keyboard 203 and optionally passes through the keyboard signal from the keyboard 203 to the tablet 202.

In some embodiments the accessory 201 is optionally attached to the tablet 202 and/or the keyboard 203 by a snap-in connector.

In some embodiments the accessory 201 is optionally approximately as wide as the width 210 of the tablet 202. Some values for width include 200 mm or even less, 225 mm, 250 mm, 275 mm, 300 mm, 325 mm, 350 mm, 375 mm, 400 mm, 450 m mm and more.

Tablets are known at various sizes, typically named after a dimension of a screen diagonal, such as approximately 6", 7" 8", 9", 10", 11", 12", 13.3", 14.1", 15.6", 17" and so on. The accessory 201 optionally provides mechanical support for various angles which does not sag under the weight of the tablet 202. A bigger, wider, and potentially heavier, tablet is optionally to a bigger, wider, and more supportive accessory 201.

Figure 3:
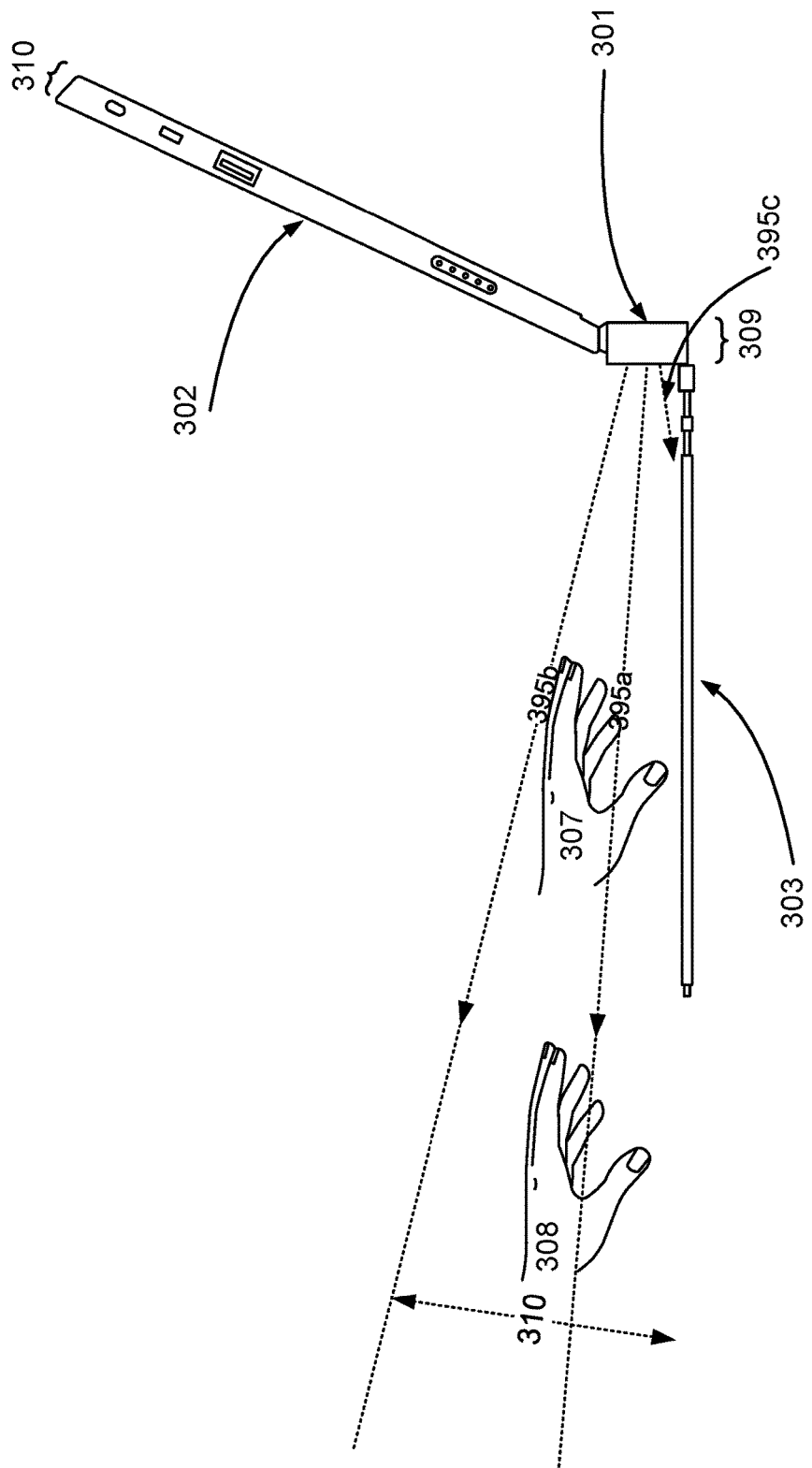
FIG. 3 is a simplified illustration of an accessory between a tablet and a keyboard according to an example embodiment of the disclosure.

Reference is now made to FIG. 3, which is a simplified illustration of an accessory 301 between a tablet 302 and a keyboard 303 according to an example embodiment of the disclosure.

FIG. 3 is intended to show how the accessory 301 can have a camera sensor included within and having a field of view (FOV) substantially parallel to a surface of the keyboard 303.

FIG. 3 depicts a central axis 395a of the FOV of the camera sensor approximately parallel to surface of the keyboard 303.

By way of a non-limiting example FIG. 3 also shows an upper limit 395b to the FOV and a bottom limit 395c to the FOV.

In some embodiments, as shown by way of a non-limiting example in FIG. 3, the bottom limit 395c to the FOV is limited by the keyboard 303, although it does not have to be this way, in some embodiments the bottom limit 395c may be aimed slightly higher than the keyboard 303.

FIG. 3 also shows a hand 307 poised above the keyboard 303. The camera (not shown) in the accessory 301 optionally captures images which include the hand 307, optionally to an image memory, and/or the images are optionally sent to the tablet 302.

In some embodiments the sending of the images to the tablet 302 is performed via an electric interface (not shown).

In some embodiments a depth of field of the camera(s) is enough to capture images of a hand 308 which may be located further along a direction of view of the camera(s), not necessarily above the keyboard 303, yet within the FOV of the camera(s).

In some embodiments a depth of field of the camera(s) extends starting at 1 centimeter from the camera lens, or even from 0.5 centimeters from the camera lens, so as to image a hand close to a top edge of the keyboard 303.

In some embodiments a depth of field of the camera(s) extends at least up to 12 centimeters from the camera lens, or even 24 centimeters, so as to image a hand at any location above the keyboard 303.

In some embodiments a depth of field of the camera(s) extends at least up to 24 centimeters or more, so as to image a hand at any location along the direction of view, even when the hand is not above the keyboard 303.

In some embodiments a depth of field of the camera(s) extends from a nearest reasonable expectation of a distance of a gesture made above a surface of the keyboard 303, to at least a distance of a reasonable expectation of a gesture made along a direction above a surface of the keyboard 303.

In some embodiments the accessory 301 is optionally approximately as deep 309 as the depth 310 of the tablet 302.

Some values for depth include 3 mm or even less, 5 mm, 8 mm, 10 mm, 13 mm, 15 mm, 20 mm, 22 mm, 25 mm, and more.

Figure 4:
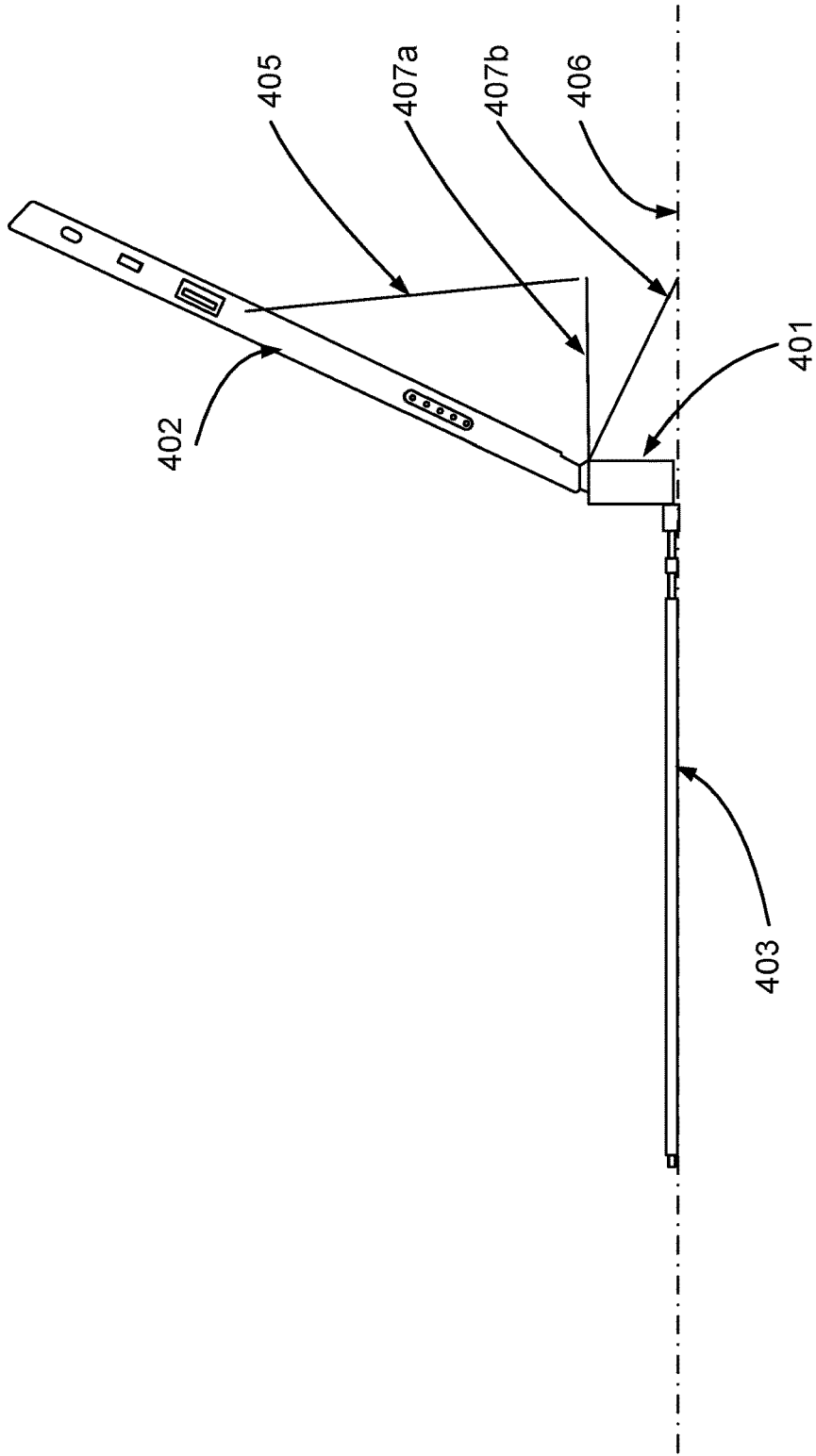
FIG. 4 is a simplified illustration of an accessory between a tablet and a keyboard according to an example embodiment of the disclosure.

Reference is now made to FIG. 4, which is a simplified illustration of an accessory 401 between a tablet 402 and a keyboard 403 according to an example embodiment of the disclosure.

FIG. 4 is intended to show how the accessory 401 can provide support for the tablet 402 to stand at an angle.

Tablets such as the tablet 402 shown in FIG. 4 often have a folding support 405 designed to rest on a resting surface 406 so as to stand at an angle.

In some embodiments, where the accessory 401 elevates the tablet 402 off the resting surface 406, the accessory 401 may optionally include support extensions such as a support extension 407a and/or 407b to compensate for the elevation of the tablet 402.

Figure 5A:
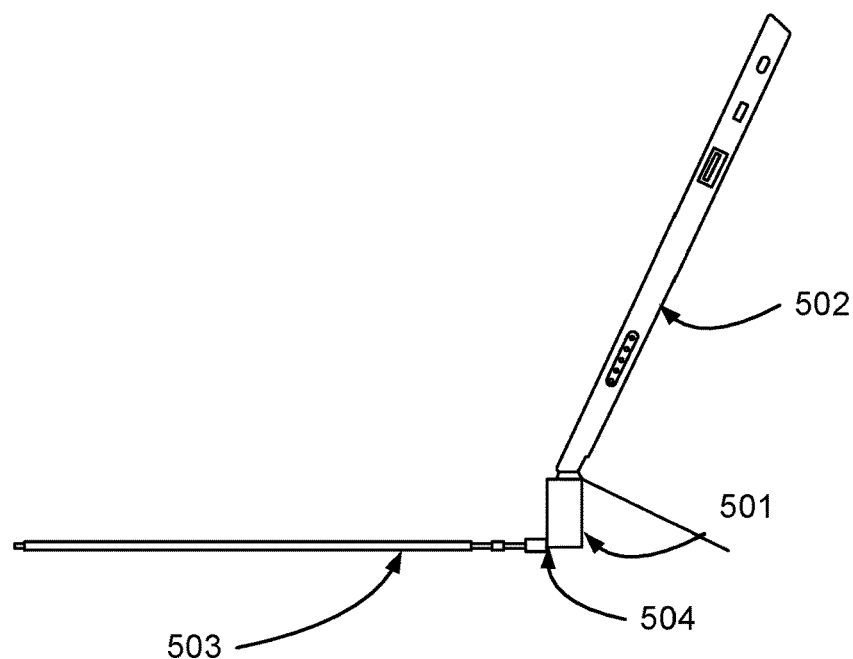
FIGS. 5A and 5B are simplified illustrations of different options for attaching accessories between tablets and keyboards according to example embodiments of the disclosure.
Figure 5B:
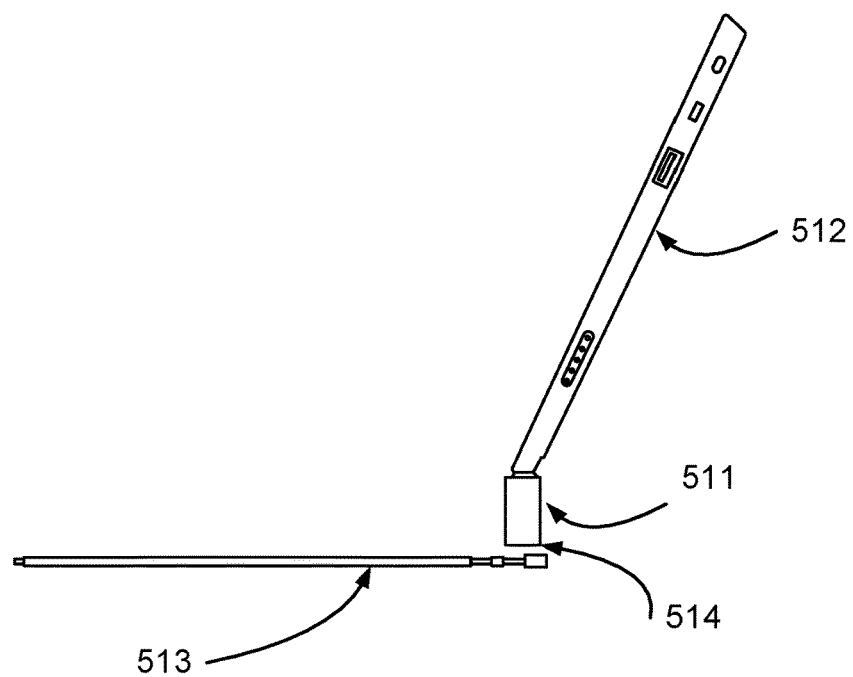

Reference is now made to FIGS. 5A and 5B, which are simplified illustrations of different options for attaching accessories 501 511 between tablets 502 512 and keyboards 503 513 according to example embodiments of the disclosure.

FIG. 5A is intended to show how the accessory 501 can attach at a side edge of a keyboard 503, and at a bottom edge of a tablet 502.

FIG. 5B is intended to show how the accessory 511 can attach at a top of a keyboard 513, and at a bottom edge of a tablet 512.

In some embodiments the tablet 502 512 is attached to the accessory 501 511 in a manner which allows changing an angle between the tablet 502 512 and the keyboard 503 513. Changing the angle may optionally be done by a user in order to improve a viewing angle.

In some embodiments, the connection of the tablet 502 512 to the accessory 501 511 includes a hinge.

In some embodiments, the connection of the tablet 502 512 to the accessory 501 511 does not include a hinge, rather the hinge is built into the accessory 501 511.

In some embodiments the hinge optionally maintains a fixed or limited range of angle between the accessory 501 511 and the keyboard 503 513.

In some embodiments the hinge optionally maintains a fixed or limited range of angle between a direction of a central axis of a FOV of the camera and the keyboard 503 513.

Various connectors are described within the present application, such as:

a mechanical connector (not shown) between the accessory 501 511 and the tablet 502 512;

a mechanical connector (not shown) between the accessory 501 511 and the keyboard 503 513;

an optional electric connector (not shown) between the accessory 501 511 and the tablet 502 512;

an optional electric connector (not shown) between the accessory 501 511 and the keyboard 503 513;

an optional electric connector (not shown) between a battery included in the keyboard 503 513 and the accessory 501 511;

an optional electric connector (not shown) between a battery included in the tablet 502 512 and the accessory 501 511; and an optional electric pass-through connector (not shown) between the tablet 502 512 and the keyboard 503 513, providing an electric connection between the tablet 502 512 and the keyboard 503 513 without electric connection to the accessory 501 511.

Figure 5C:
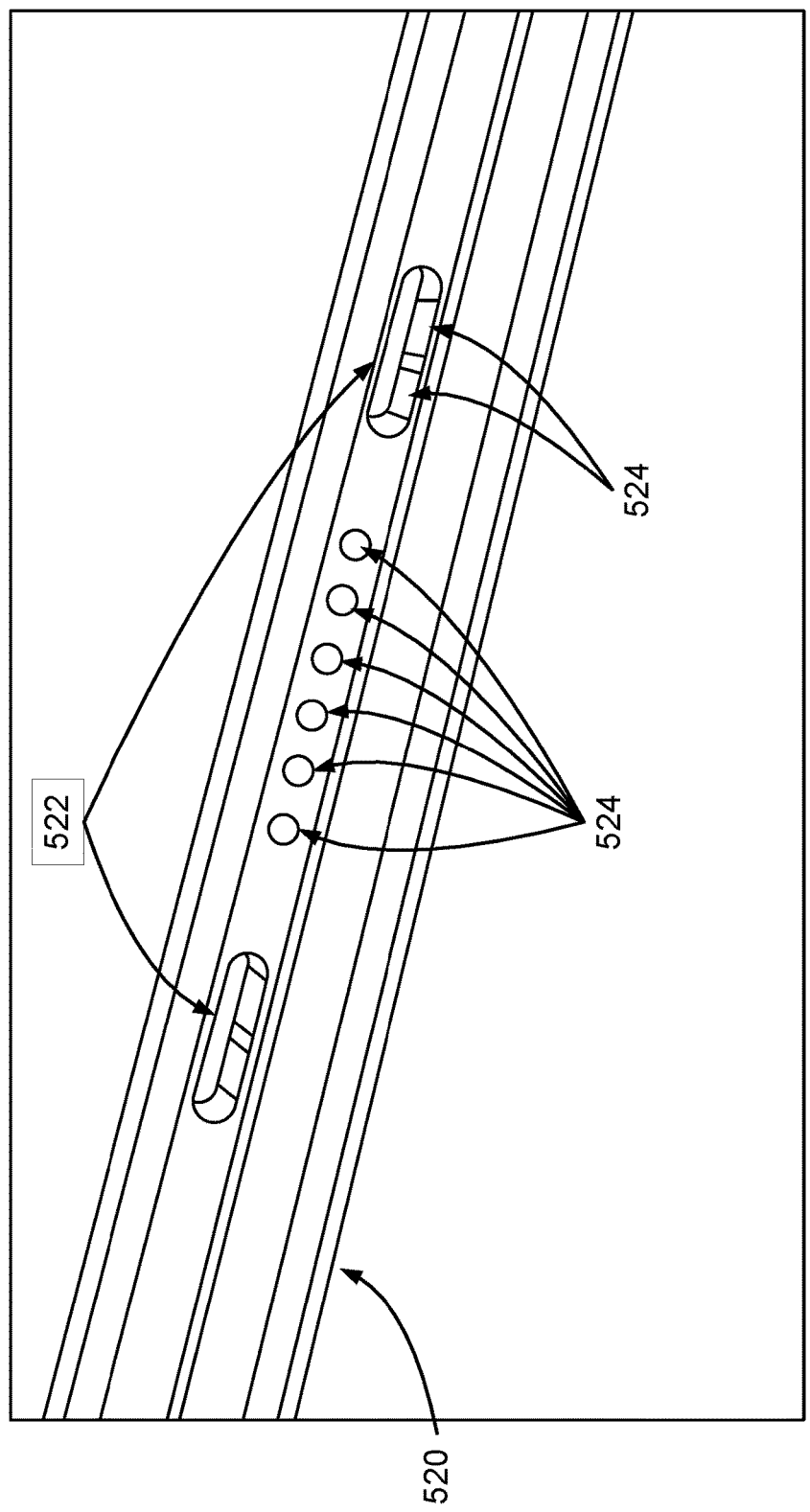
FIG. 5C is a simplified illustration of connectors for connecting a tablet and a keyboard according to an example embodiment of the disclosure.

Reference is now additionally made to FIG. 5C, which is a simplified illustration of connectors for connecting a tablet 520 and a keyboard according to an example embodiment of the disclosure.

FIG. 5C depicts an image of an edge of a Microsoft Surface device, as an example of some types of connectors, which may be used for connecting an accessory such as the accessories 501 511 to a tablet such as the tablets 502 512 520 and to keyboard such as the keyboards 503 513.

One type of example connector is a mechanical connector 522, which accepts an insert into a cavity, and connects the tablet 520 to the accessory, optionally supporting the weight of the tablet 520.

The tablet may optionally include more than one mechanical connector 522, and the accessory (not shown) may include more than one insert for inserting into a cavity of the mechanical connector 522.

In some embodiments the mechanical connector 522 may optionally include one or more electrical connectors 523, as shown in FIG. 5C.

In some embodiments the mechanical connector 522 may optionally be a snap-in connector.

One type of example connector is an electric connector 524, which optionally acts as an electric contact. The electric connector 524 may optionally transfer power from the tablet 520 to an accessory (not shown), transfer power from an accessory (not shown) to the tablet 520, transfer an electric signal, such as keyboard signals, from or to the tablet 520, and transfer digital image(s) from the accessory to the tablet 520.

It is noted that the accessory of the present disclosure may include one or more mechanical and/or electric connectors for mating to the corresponding connectors on a tablet.

In some embodiments the accessory (not shown in FIG. 5C) optionally acts as a signal connector between the keyboard (not shown) and the tablet 520.

In some embodiments the accessory potentially passes electrical signals from a camera in the accessory and optionally also as a connection hub, such as a USB hub, connecting and passing keyboard signals to the tablet 520.

In some embodiments a side edge of the accessory (not shown) optionally includes additional connectors, such as one or more USB connectors, which enable the accessory potentially acting as a signal pass-through hub such as a USB hub.

Figure 5D:
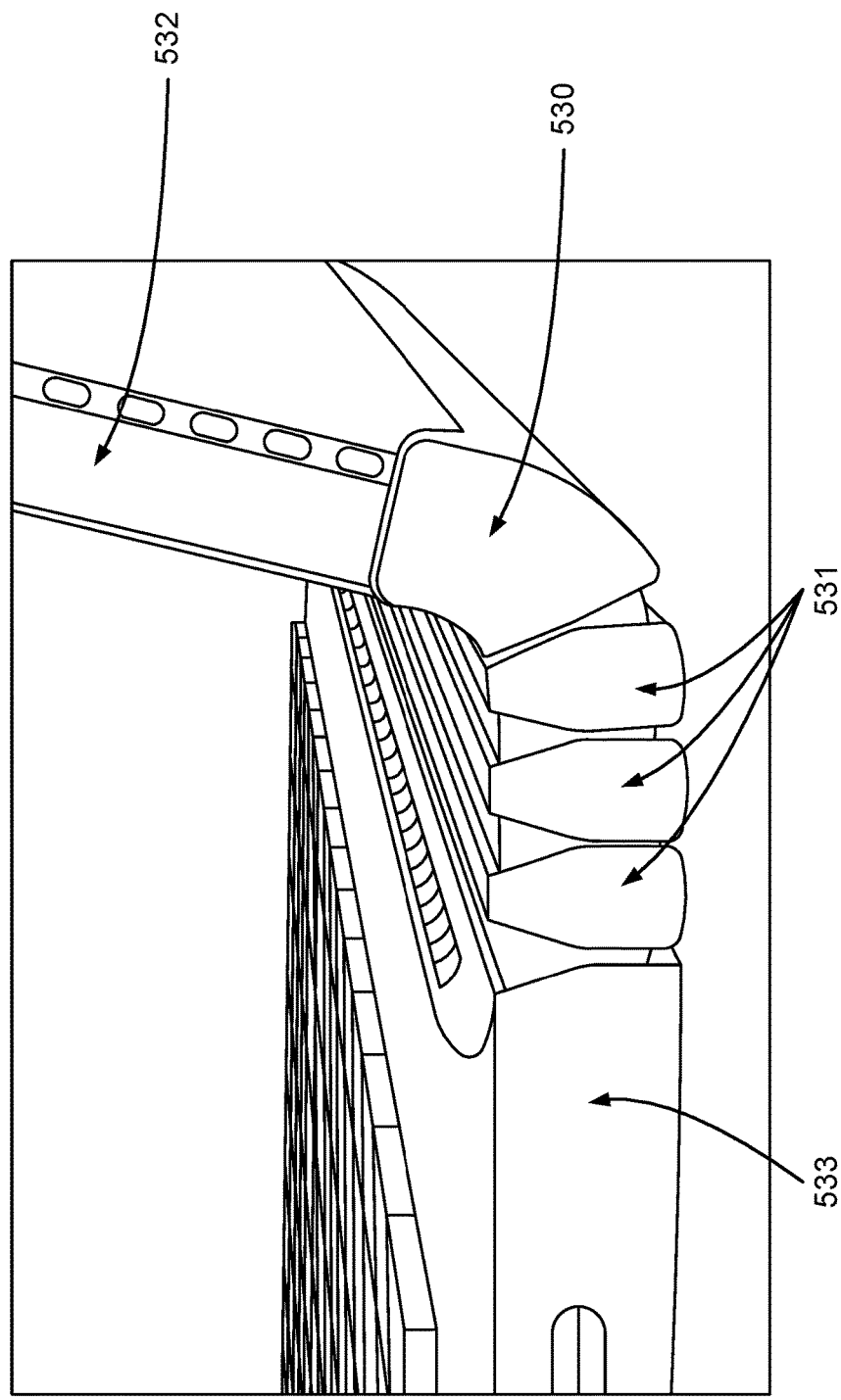
FIG. 5D is a simplified illustration of a hinge for connecting a tablet and a keyboard according to an example embodiment of the disclosure.

Reference is now made to FIG. 5D, which is a simplified illustration of a hinge 530 531 for connecting a tablet 532 and a keyboard 533 according to an example embodiment of the disclosure.

FIG. 5D depicts an image of an edge of a Microsoft Surface device as an example of the tablet 532, the keyboard 533, and a hinge 530 531 for supporting the tablet 532 at various angles.

In some embodiments an upper portion 530 of the hinge 530 531 contains an imager, optionally a camera, which has a field of view with a direction, optionally a central axis, substantially parallel to a plane of the keyboard 533.

Tablets are known at various sizes, typically named after a dimension of a screen diagonal, such as approximately 6", 7" 8", 9", 10", 11", 12", 13.3", 14.1", 15.6", 17" and so on. The hinge 530 531 optionally provides mechanical support for various angles which does not sag under the weight of the tablet 532. A bigger, wider, and potentially heavier, tablet is optionally to a bigger, wider, and more supportive hinge 530 531.

Reference is now made to FIGS. 6A and 6B, which are simplified flow chart illustrations of data flow between a camera and a computing unit and a tablet respectively, according to example embodiments of the disclosure.

FIG. 6A is intended to depict data flow from a camera in the accessory to a computing unit, optionally for deciphering gestures.

FIG. 6A depicts a camera 602 such as the camera described above as included in the accessory, capturing an image(s) 601:

the camera 602 optionally sends the image(s) to an image receiving circuit 604;

the image receiving circuit 604 optionally sends the image(s) to an image transmitting circuit 606; and the image transmitting circuit 606 optionally transmits the image(s) to a computing unit 608.

FIG. 6B is intended to depict data flow from a camera in the accessory to a tablet, optionally for deciphering gestures. In some embodiment a computing unit is included the tablet.

FIG. 6B depicts a camera 612 such as the camera described above as included in the accessory, capturing an image(s) 611:

the camera 612 optionally sends the image(s) to an image receiving circuit 614;

the image receiving circuit 614 optionally sends the image(s) to an image transmitting circuit 616; and the image transmitting circuit 616 optionally transmits the image(s) to a tablet 618.

In some embodiments, the tablet optionally displays the image(s) on a tablet display.

FIG. 6C is intended to depict data flow from a camera in the accessory to a computing unit for deciphering gestures in the accessory, and subsequently to a tablet.

FIG. 6C depicts a camera 622 such as the camera described above as included in the accessory, capturing an image(s) 621:

the camera 622 optionally sends the image(s) to an image receiving circuit 624;

the image receiving circuit 624 optionally sends the image(s) to computing circuit 626 in the accessory, which optionally identifies gestures;

the computing unit 626 optionally sends the gesture(s) to a gesture transmitting circuit 628; and the gesture transmitting circuit 628 optionally transmits the gesture(s) to a tablet 630.

Figure 7:
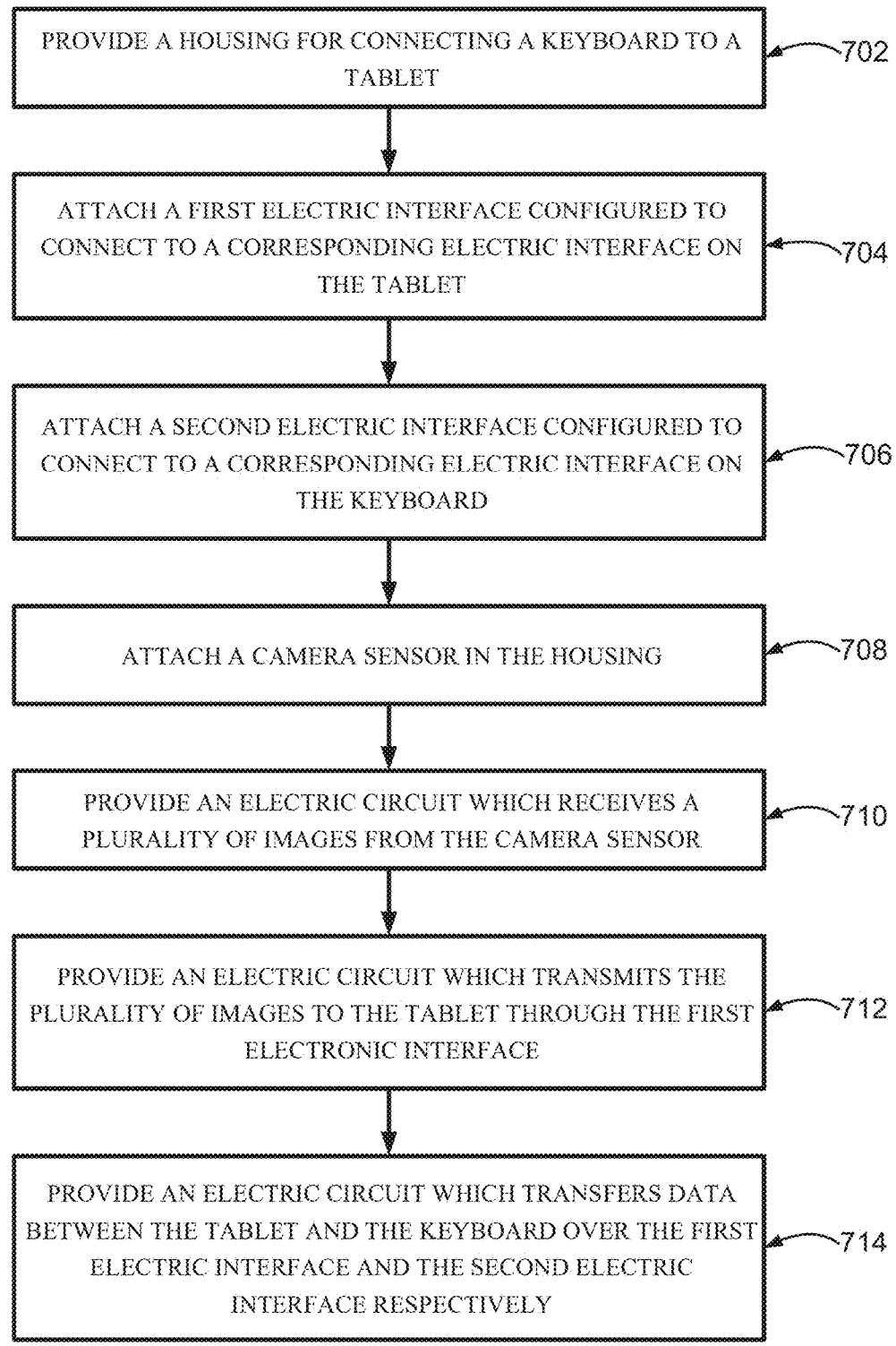
FIG. 7 is a simplified flow chart illustration of a method of manufacturing an accessory which can be attached between a tablet and a keyboard according to an example embodiment of the disclosure.

Reference is now made to FIG. 7, which is a simplified flow chart illustration of a method of manufacturing an accessory which can be attached between a tablet and a keyboard according to an example embodiment of the disclosure.

The method depicted by FIG. 7 includes:

(a) providing a housing for connecting a keyboard to a tablet, wherein width and depth measurements of the housing are set to match respectively width and depth measurements of the tablet (702);

(b) attaching a first electric interface configured to connect to a corresponding electric interface on the tablet (704);

(c) attaching a second electric interface configured to connect to a corresponding electric interface on the keyboard (706);

(d) attaching a camera sensor in the housing, the camera sensor positioned such that a central axis of a field of view (FOV) of the camera sensor is substantially parallel to a surface of the keyboard when the accessory is operationally attached to the keyboard (708);

(e) providing an electric circuit which receives a plurality of images from the camera sensor (710);

(f) providing an electric circuit which transmits the plurality of images to the tablet through the first electronic interface (712); and (g) providing an electric circuit which transfers data between the tablet and the keyboard over the first electric interface and the second electric interface respectively.

It is expected that during the life of a patent maturing from this application many relevant keyboards, tablet computers and cameras will be developed and the scope of the terms keyboard, tablet computer and camera are intended to include all such new technologies a priori.

As used herein the terms "about" and "approximately" refer to ±20%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

According to an aspect of some embodiments of the present disclosure there is provided apparatus including (a) a housing for coupling a keyboard to a tablet device through at least one respective electric interface and circuitry integrated in the housing, and (b) a camera sensor integrated in the housing, the camera sensor positioned such that a central axis of a field of view (FOV) of the camera sensor is substantially parallel to a surface of the keyboard, the camera sensor further positioned to capture a plurality of images and to transmit the plurality of images to the tablet device through the respective electric interface and the electric circuitry.

According to some embodiments of the disclosure, the housing includes a first electric interface configured to connect to a corresponding electric interface on the tablet, a second electric interface configured to connect to a corresponding electric interface on the keyboard, an electric circuit which receives the plurality of images from the camera sensor, and an electric circuit which transmits the plurality of images to the tablet device through the first electric interface.

According to some embodiments of the disclosure, further including a computing circuit which receives the plurality of images from the camera sensor, performs gesture recognition, and sends data indentifying gestures to the tablet through the first electronic interface.

According to some embodiments of the disclosure, the data identifying gestures includes gesture events.

According to some embodiments of the disclosure, width and depth measurements of the housing are set to match respectively width and depth measurements of the tablet.

According to some embodiments of the disclosure, further including an electric circuit which transfers data between the tablet and the keyboard over the first electric interface and the second electric interface respectively.

According to some embodiments of the disclosure, the camera sensor has a depth of field extending from 1 centimeter from the camera sensor to 12 centimeters from the camera sensor. According to some embodiments of the disclosure, the camera sensor has a depth of field extending from 1 centimeter from the camera sensor to 24 centimeters from the camera sensor.

According to some embodiments of the disclosure, further including the housing including a hinge for allowing a change of angle of connection of the tablet relative to the keyboard.

According to some embodiments of the disclosure, the hinge allows a change of angle of connection of the tablet relative to the keyboard, while maintaining a fixed angle between the central axis of the FOV of the camera sensor and the keyboard.

According to some embodiments of the disclosure, the hinge allows a change of angle of connection of the tablet relative to the keyboard, while allowing a smaller change of angle of the central axis of the FOV of the camera sensor relative to the keyboard.

According to some embodiments of the disclosure, the camera sensor includes a plurality of camera sensors. According to some embodiments of the disclosure, the camera sensor includes an infra-red camera sensor.

According to some embodiments of the disclosure, further including a light filter for filtering light entering the camera sensor.

According to some embodiments of the disclosure, further including a light source for illuminating the FOV of the camera sensor. According to some embodiments of the disclosure, the light source is an infra-red light source.

According to some embodiments of the disclosure, further including a light filter for filtering light from the light source.

According to some embodiments of the disclosure, further including the light source being powered from the keyboard via the second electric interface.

According to some embodiments of the disclosure, further including the light source being powered from the tablet via the first electric interface. According to some embodiments of the disclosure, the first electric interface includes a USB (universal serial bus) interface. According to some embodiments of the disclosure, the second electric interface includes a USB (universal serial bus) interface.

According to an aspect of some embodiments of the present disclosure there is provided a method of manufacturing an accessory which can be attached between a tablet and a keyboard, the method including (a) providing a housing for coupling a keyboard to a tablet device through at least one respective electric interface and circuitry integrated in the housing, and (b) integrating a camera sensor in the housing, the camera sensor positioned such that a central axis of a field of view (FOV) of the camera sensor is substantially parallel to a surface of the keyboard, the camera sensor further positioned to capture a plurality of images and to transmit the plurality of images to the tablet device through the respective electric interface and the electric circuitry.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. An apparatus comprising:
   (a) a housing for removably coupling a keyboard to a tablet device through a plurality of electric interfaces and circuitry integrated in said housing, said housing is configured to externally and mechanically attach to said keyboard and externally and mechanically attach to said tablet device, said housing including a hinge configured to allow relative movement of (i) said tablet device externally and mechanically attached to said housing and (ii) said keyboard externally and mechanically attached to said housing, said plurality of electric interfaces comprising:
   a first electric interface configured to connect electronically to a tablet electric interface, and
   a second electric interface configured to connect electronically to a keyboard electric connector, wherein said first electric interface and said second electric interface are opposing electric interfaces; and
   (b) a camera sensor integrated in said housing, said camera sensor positioned such that a central axis of a field of view (FOV) of said camera sensor is parallel to a surface of said keyboard, said camera sensor further configured to capture a plurality of images and to transmit said plurality of images to said tablet device through said first electric interface and said electric circuitry.

2. The apparatus of claim 1, and further comprising a light source for illuminating said FOV of said camera sensor.

3. The apparatus of claim 2, in which said light source is an infra-red light source.

4. The apparatus of claim 2, and further comprising a light filter for filtering light from said light source.

5. The apparatus of claim 2, and further comprising said light source being powered from said keyboard via an additional electric interface configured to connect to a corresponding electric interface on said keyboard.

6. The apparatus of claim 2, and further comprising said light source being powered from said tablet via said first electric interface.

7. The apparatus of claim 1, wherein said hinge allows a change of angle of connection of the tablet relative to the keyboard, and said hinge contains the camera sensor.

8. The apparatus of claim 7, in which said hinge allows a change of angle of connection of the tablet relative to the keyboard, while maintaining a fixed angle between said central axis of said FOV of said camera sensor and said keyboard.

9. The apparatus of claim 7, in which said hinge allows a change of a first angle of connection of the tablet relative to the keyboard, while allowing a change of a second angle of said central axis of said FOV of said camera sensor relative to said keyboard, said second angle is smaller than said first angle.

10. The apparatus of claim 1, further comprising a computing circuit which receives said plurality of images from said camera sensor, performs gesture recognition, and sends data identifying gestures to said tablet through said first electric interface, wherein the data identifying gestures comprise gesture events.

11. The apparatus of claim 10, wherein said computing circuit further performs at least one of face recognition and gaze recognition using said plurality of images.

12. The apparatus of claim 1, wherein width and depth measurements of said housing are set to match respectively width and depth measurements of said tablet.

13. The apparatus of claim 1, further comprising a third electric circuit which transfers data between said tablet and said keyboard over said first electric interface and said second electric interface respectively.

14. The apparatus of claim 1, in which said camera sensor has a depth of field extending from 1 centimeter from said camera sensor to 12 centimeters from said camera sensor.

15. The apparatus of claim 1, in which said camera sensor has a depth of field extending from 1 centimeter from said camera sensor to 24 centimeters from said camera sensor.

16. The apparatus of claim 1, in which said camera sensor comprises a plurality of cameras.

17. The apparatus of claim 1, in which said camera sensor comprises an infra-red camera sensor.

18. The apparatus of claim 1, and further comprising a light filter for filtering light entering said camera sensor.

19. The apparatus of claim 1, in which said first electric interface comprises a USB (universal serial bus) interface.

20. The apparatus of claim 1, in which said second electric interface comprises a USB (universal serial bus) interface.

21. The apparatus of claim 1, wherein said camera sensor has a depth of field extending longitudinally beyond said keyboard to allow an identification of user gestures performed remotely from said keyboard.

22. The apparatus of claim 1, wherein at least one of said externally and mechanically attachment of said housing to said keyboard, and said externally and mechanically attachment to said tablet device is done using a snap-in connector.

23. A method of manufacturing an accessory which can be attached between a tablet and a keyboard, the method comprising:
(a) providing a housing for removably coupling a keyboard to a tablet device through a plurality of electric interfaces and circuitry integrated in said housing, said housing is configured to externally and mechanically attach to said keyboard and externally and mechanically attach to said tablet device, said housing including a hinge configured to allow relative movement of (i) said tablet device externally and mechanically attached to said housing and (ii) said keyboard externally and mechanically attached to said housing, said plurality of electric interfaces comprising:
a first electric interface configured to connect electronically to a tablet electric interface, and
a second electric interface configured to connect electronically to a keyboard electric connector, wherein said first electric interface and said second electric interface are opposing electric interfaces; and
(b) integrating a camera sensor in said housing, said camera sensor positioned such that a central axis of a field of view (FOV) of said camera sensor is parallel to a surface of said keyboard, said camera sensor further configured to capture a plurality of images and to transmit said plurality of images to said tablet device through said first electric interface and said electric circuitry.

24. An apparatus comprising:
(a) a housing for removably coupling a keyboard to a tablet device through a plurality of electric interfaces and circuitry integrated in said housing, said housing is configured to externally and mechanically attach to said keyboard and externally and mechanically attach to said tablet device, said housing including a hinge configured to allow relative movement of (i) said tablet device externally and mechanically attached to said housing and (ii) said keyboard externally and mechanically attached to said housing, said plurality of electric interfaces comprising opposing tablet and keyboard electric interfaces; and
(b) a camera sensor integrated in said housing, said camera sensor positioned such that a central axis of a field of view (FOV) of said camera sensor is parallel to a surface of said keyboard, said camera sensor further configured to capture a plurality of images and to transmit said plurality of images to said tablet device through said tablet electric interface and said electric circuitry.

* * * * *